(12) United States Patent
Beck

(10) Patent No.: US 8,096,319 B2
(45) Date of Patent: Jan. 17, 2012

(54) CHECK VALVE

(75) Inventor: Hubert Beck, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 192 days.

(21) Appl. No.: 11/827,714

(22) Filed: Jul. 13, 2007

(65) Prior Publication Data

US 2008/0029165 A1 Feb. 7, 2008

(30) Foreign Application Priority Data

Aug. 5, 2006 (DE) .......................... 10 2006 036 691

(51) Int. Cl.
*F16K 15/04* (2006.01)

(52) U.S. Cl. ................... 137/543.19; 251/337; 267/159; 267/160

(58) Field of Classification Search .................. 137/539, 137/543.19; 251/337; 267/159, 160, 178
See application file for complete search history.

(56) References Cited

U.S. PATENT DOCUMENTS

| 2,401,856 | A | * | 6/1946 | Brock | 411/517 |
| 3,302,662 | A | * | 2/1967 | Webb | 137/539 |
| 5,960,822 | A | * | 10/1999 | Matuschka et al. | 137/493.8 |
| 6,244,295 | B1 | * | 6/2001 | Bartussek et al. | 137/540 |
| 6,401,749 | B1 | * | 6/2002 | Tai et al. | 137/540 |
| D528,407 | S | * | 9/2006 | Schwab | D8/399 |
| 7,353,842 | B2 | * | 4/2008 | Speer et al. | 137/539 |
| 2004/0177884 | A1 | * | 9/2004 | Konishi | 137/540 |

FOREIGN PATENT DOCUMENTS

DE 40 25 488 2/1991

\* cited by examiner

*Primary Examiner* — Stephen M Hepperle
*Assistant Examiner* — William McCalister
(74) *Attorney, Agent, or Firm* — Cozen O'Connor

(57) ABSTRACT

Check valve includes a housing, a bore, and a movable valve body, which is spring-loaded and rests with a sealing action on a valve seat, where the bore is designed as a stepped bore, where the bore with the smaller diameter has the valve seat, and where the bore with the larger diameter holds the movable valve element. The valve body is designed as a ball, which is guided in the bore by at least two guide ribs, and a retaining element in the terminal area of the bore captures the ball and simultaneously spring-loads it.

16 Claims, 4 Drawing Sheets

CHECK VALVE

BACKGROUND OF THE INVENTION

1. Field of the Invention

The invention pertains to a check valve, consisting of a housing, a bore, and a movable valve body, which is spring-loaded and rests with a sealing action on a valve seat, where the bore is designed as a stepped bore, and where the bore with the smaller diameter has the valve seat and the bore with the larger diameter holds the movable valve element.

2. Description of the Related Art

Check valves are already known (DE 40 25 488 C2) in which a movable valve element is provided, where a ball-shaped valve body is provided at least in the area of the valve seat. A closing spring keeps this valve body under pretension. A movable cylindrical part and a stationary cylindrical part, furthermore, create an annular space, the volume of which changes with the movement of the inner parts. The action of the valve can thus be damped by way of a throttle bore. Check valves of this design, especially those with a valve ball or a segment of a ball, operate very precisely in principle, but their disadvantage is that a large mass must be moved, and the valve thus cannot react quickly enough for high-frequency actuations. To avoid contact noises, therefore, a check valve of this type is preferably damped.

This design also occupies a considerable amount of space and, simply because of the number of individual parts and their shapes, it is unsuitable for completely automated assembly.

SUMMARY OF THE INVENTION

An object of the invention is to create a low-noise check valve which can be actuated at high frequency, which occupies a minimum of space, and which can be produced at low cost under mass production conditions.

According to the invention a ball is used as the valve body, which is guided in the bore by at least two guide ribs, and a retaining element located in the terminal area of the bore captures the ball and simultaneously spring-loads the ball.

It is advantageous here that a ball is used as the valve body and that this ball is guided with precision between the guide ribs. The retaining element, in the form of a contoured spring disk with an opening in the center, acts on the ball in such a way that it can open the valve against the force of the spring, but is limited in its stroke at the same time. To minimize noise, the stroke of the ball is also limited elastically.

According to another feature, the guide ribs are distributed uniformly around the circumference of the bore.

According to another essential feature, the retaining element has at least two radially inward-directed projections, which serve to limit the stroke of the valve body. It is advantageous here for the stroke of the ball to be limited by the projections, which are designed to act as springs, but which, as a result of their progressive spring characteristic, are also able to limit the stroke in the desired manner.

According to another embodiment, the retaining element has at least one radially inward-directed spring tongue, which keeps the valve body under elastic pretension. It is advantageous here that the spring tongue is also an integral part of the retaining element, so that the projections, the spring tongue, and the retaining element can be produced out of a single piece of material. To ensure that the flow is throttled to the least possible extent, the guide ribs extend axially over only part of the bore. It is advantageous here for the guide ribs to have a free area underneath the retaining element, so that the fluid can flow smoothly through the check valve.

According to another embodiment, the retaining element is held positively in place in the housing. It is advantageous here to hold the retaining element positively in place by peening-over parts of the material of the housing.

According to another embodiment, the radial projections are capable of elastic movement in the axial direction.

The retaining element can be held in place positively in the valve housing, but it is also possible for the retaining element to be bonded to the housing with an adhesive. It is advantageous to use an adhesive, but welding or soldering is also conceivable.

According to another exemplary embodiment, the housing is an undercut-free, as-molded part.

According to another embodiment, there is at least a partial free area between the guide ribs of the housing and the retaining element.

It is advantageous here for the housing to be produced by sintering or pressing.

According to another feature, the retaining element is a disk-shaped component which allows a flowing medium to pass through, while its center part exerts elastic force on the valve body.

According to another essential feature, the retaining element has a closed, circular outer area, from which a spring tongue extends all to the way to the center.

It is advantageous for the spring tongue to be in the form of a circle or spiral so that a softer spring characteristic can be obtained.

The retaining element may be produced by stamping, or the retaining element may be shaped out of a piece of spring wire.

According to another embodiment, the retaining element has a compression-resistant outer area suitable for the peening process.

It is advantageous for the retaining element to be held in place on the housing by means of a claw-type connection.

According to another feature, the housing has a cutting edge on at least one end surface, so that it can be installed tightly in a receiving bore.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
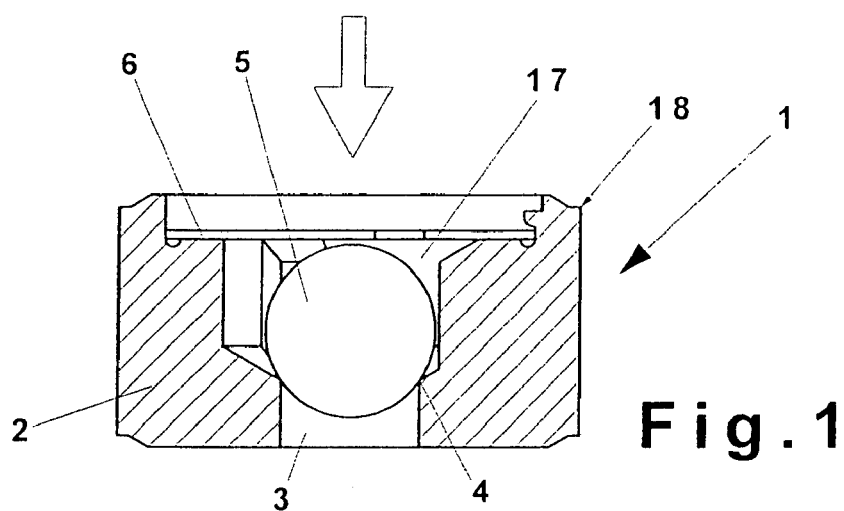
FIGS. 1 and 2 are partial cross sections of the check valve in the closed and open positions.

FIG. 1 shows the check valve 1 with a housing 2, which preferably can be produced without any undercuts, i.e., as-molded, without the need for any finish machining, ready for use just as it comes from the mold. A sintering or pressing technique is preferred for the production of this housing.

The housing 2 has a central inflow bore 3, which forms the valve seat 4 at the transition to the bore 17. In the area of its valve seat 4, the inflow bore 3 is closed by the valve body 5, designed as a ball. Above the valve body 5 there is a retaining element 6, in the form of an internally contoured spring disk, which is arranged in such a way that its outer edge is permanently connected to the housing 2, while its inner area exerts elastic force either directly or at least approximately on the center of the valve body 5.

The housing 2 has a cutting edge 18 on at least one end surface, which allows it to be installed tightly in a receiving bore.

Figure 2:
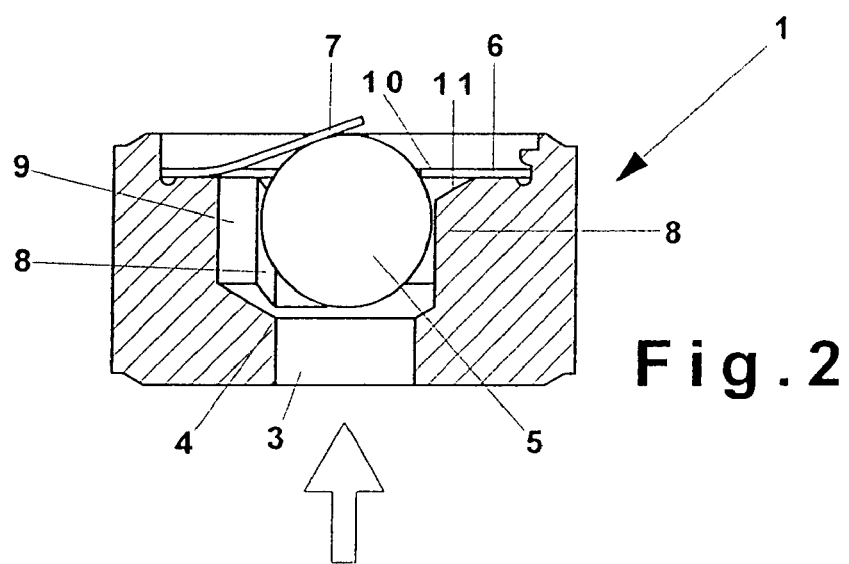

FIG. 2 shows the check valve 1 of FIG. 1 in the open position, where the valve body 5 has been lifted from the valve seat 4 against the elastic force of the retaining element 6, i.e., the force of its spring tongue 7, by the flow arriving through the inflow bore 3.

The valve body 5 is centered by guide ribs 8. The flow passes around the valve body 5 at least partially via longitudinal channels 9 on the circumference and then passes through the remaining open area of the retaining element 6, the stroke of the valve body 5 being limited by the three projections 10 of the retaining element 6.

The end stop of the valve body 5 can be spring-loaded and thus also have the effect of minimizing noise. To ensure that the flow is throttled to the minimum possible extent, the guide ribs 8 have a free area 11 underneath the retaining element 6, especially in the case of the smallest sizes of these check valve designs. The shape of the free area can be individually adapted.

Figure 3:
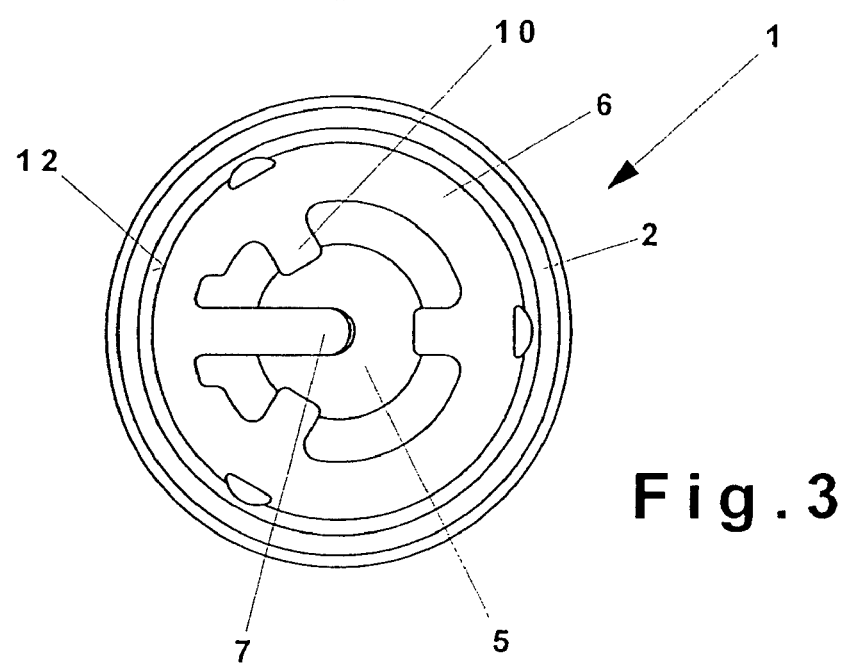
FIG. 3 is a plan view of the check valves.

FIG. 3 shows a top view of the check valve 1 illustrated in FIG. 1 with a housing 2 and a retaining element 6, which is designed in the form of a flat spring disk. The retaining element 6 is flat, because this facilitates handling in bulk, and it can thus be placed in the centering recess 12 of the housing 2 by machine without having to worry about its angular orientation or having to determine which is the right side and which the wrong side. The retaining element 6 has a spring tongue 7, which acts elastically on the valve body 5, where the three projections 10 serve as an end stop for the valve body 5 in the axial direction. Depending on the stiffness of the spring tongue 7, the projections 10 can be eliminated entirely, because the maximum outward travel of the valve body 5 caused by the flow is often very short. The spring tongue 7 will then stop the valve body by itself by virtue of its own stiffness.

The opening pressure of the check valve and the stroke can be varied as desired by appropriate choice of the retaining element 6, e.g., through choice of its inner contours and/or its thickness. The retaining element 6 is permanently attached to the housing 2 by a positive connection, for example, or by a claw-type connection, by adhesive bonding, or by welding.

Figure 4:
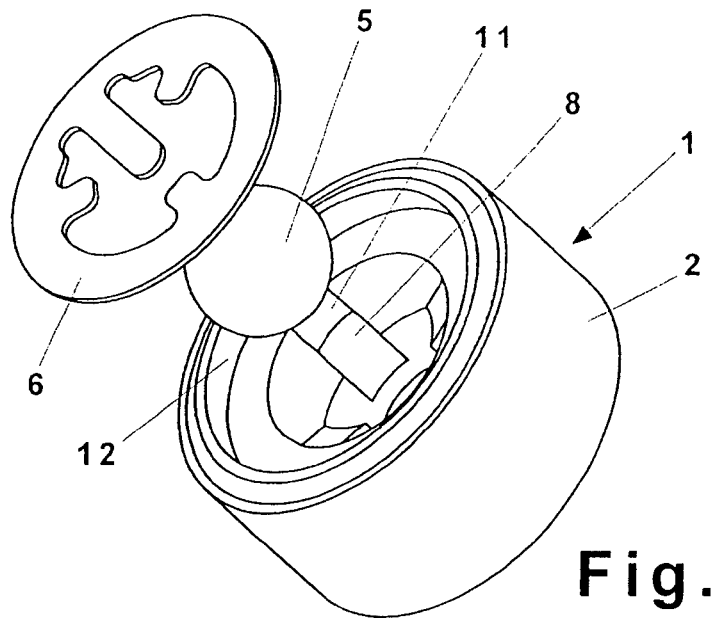
FIGS. 4-6 are perspective views of the check valve illustrated in FIGS. 1-3.

FIG. 4 shows an exploded diagram of a highly miniaturized check valve 1 with the housing 2, the valve body 5, and the retaining element 6. To optimize the flow, the guide ribs 8 have a free area 11 at the top, so that the retaining element can be inserted into the centering bore 12 of the housing 2 without having to occupy any predetermined position.

Figure 5:
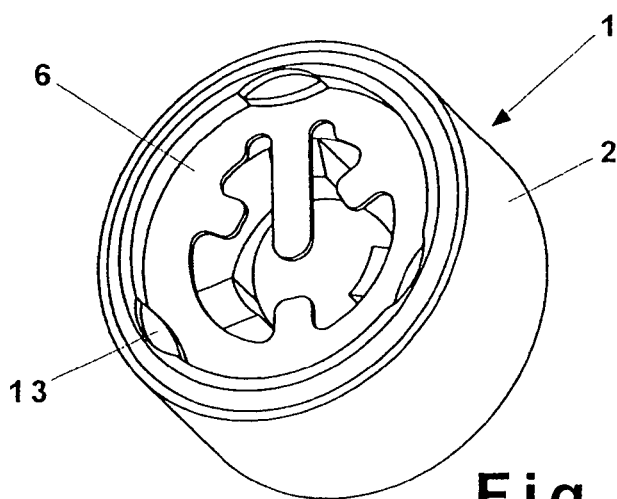

FIG. 5 shows the completely assembled check valve 1, where the retaining element 6 is permanently connected to the housing 2 by localized peening 13.

Figure 6:
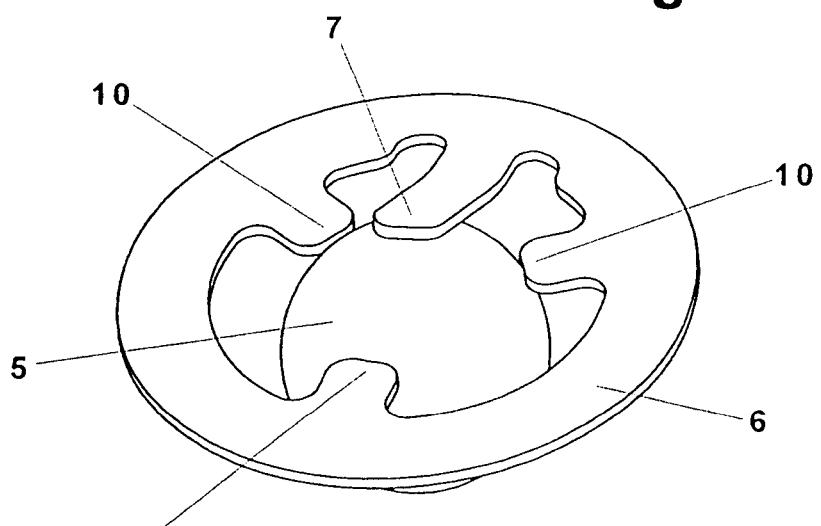

FIG. 6 shows the retaining element 6 together with the valve body 5 in a position in which the valve body 5 has actuated the spring tongue 7 in such a way that the projections 10 are acting as an end stop.

Figure 7:
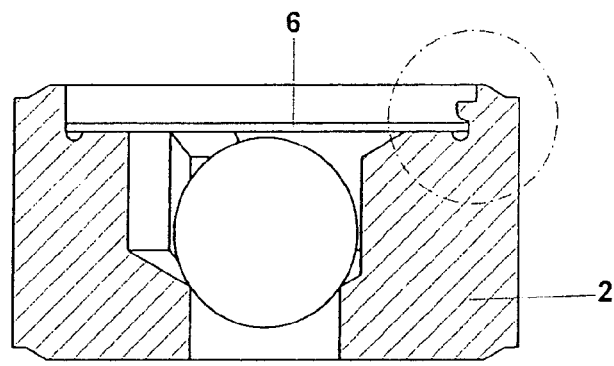
FIGS. 7-7*d* show various ways in which the retaining element can be held in place on the valve housing.
Figure 7A:
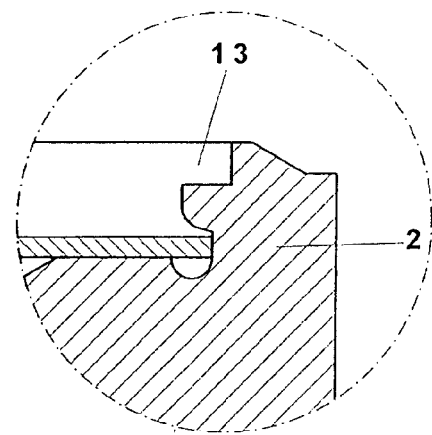
Figure 7B:
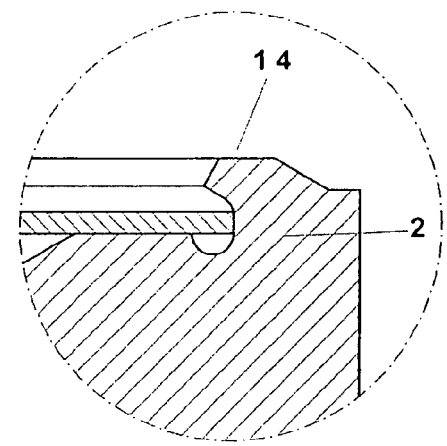
Figure 7C:
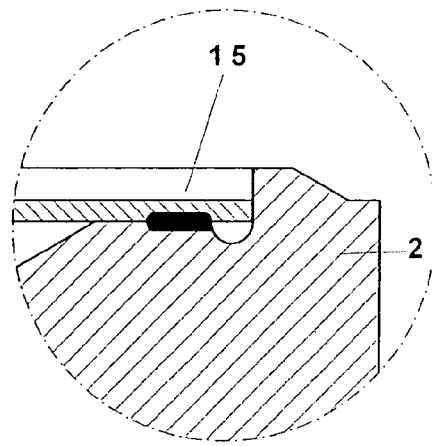
Figure 7D:
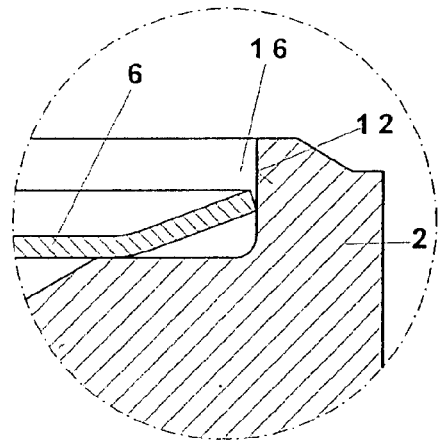

FIGS. 7-7d show various ways in which the retaining element 6 can be attached to the housing 2. FIG. 7 shows the principle, illustrated in FIG. 1, of fastening the retaining element 6 to the housing 2 by means of localized peening. A magnified view of this localized peening 13 can be seen in FIG. 7a. The localized peening can be provided at several points distributed around the circumference of the housing 2.

FIG. 7b shows a housing 2, in which the peening has been performed all the way around; that is, the entire circumference has been peened over. FIG. 7c shows a welded or adhesively bonded joint 15.

FIG. 7d shows a retaining element 6 with an angled area at the outer edge, or circumferential claw, which forms a claw-type connection 16 when the element is pressed into the housing 2. The retaining element 6 is therefore held positively in place in the centering recess 12 of the housing 2 by means of the corresponding interference connection.

Figure 8:
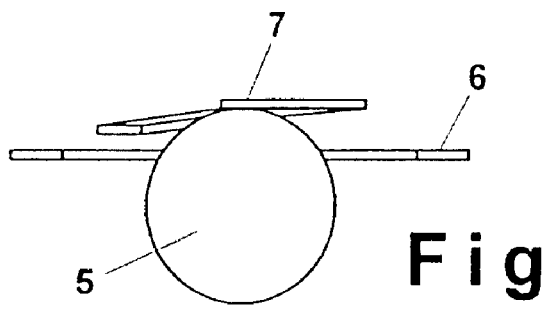
FIGS. 8-10 show additional designs of the retaining element.

FIG. 8 shows a retaining element 6, which is supported elastically by its spring tongue 7 on the valve body 5.

Figure 9:
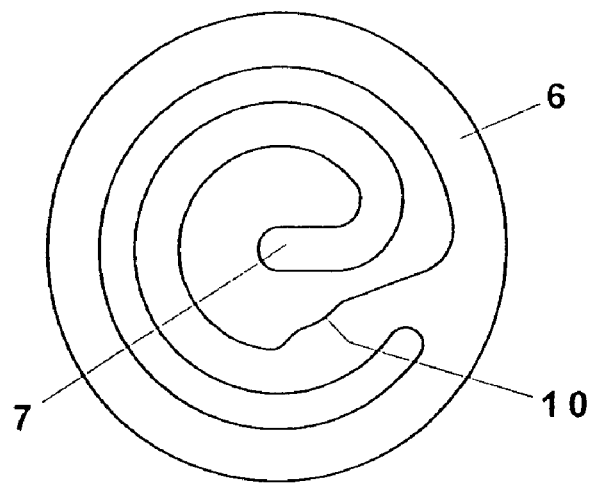

FIG. 9 shows a top view of the retaining element 6 of FIG. 8. A projection 10, which ultimately limits the stroke of the valve body 5, can be omitted, depending on the stiffness of the spring. Depending on the design of the spring tongue 7, it is also possible for the valve body 5 to make early contact with the retaining element 6, if desired, so that the stroke can be limited in the desired manner. The spring tongue 7 is designed here with a circular or spiral shape because of the desire for a softer spring.

Figure 10:
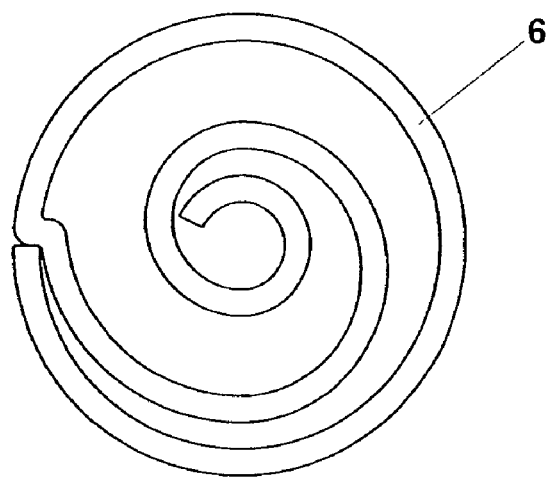

FIG. 10 shows a retaining element 6 of spring steel wire. The outer edge is circular and designed to be compression-resistant to allow peening.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:
1. A check valve comprising:
a housing;
a stepped bore having a small diameter section and a large diameter section, the small diameter section forming a valve seat adjacent to the large diameter section, the large diameter section having a circumferential wall formed with a plurality of guide ribs;
a ball guided in the large diameter section by the guide ribs; and
a resilient retaining element fixed in the housing over the large diameter section opposite from the valve seat, the retaining element capturing the ball in the large diameter section and spring loading it toward the seat when the valve is open, wherein the retaining element is a single piece retaining element with at least one radially inward directed projection forming an end stop which limits movement of the ball and a spring tongue that exerts a resilient force on the ball, the projection includes a radially outer end fixed to the retaining element and a radially inner free end, wherein the spring tongue is connected to an outer diameter of the retaining element at only a single point.

2. The check valve of claim 1 wherein the guide ribs are distributed uniformly around the circumferential wall.

3. The check valve of claim 1 wherein the guide ribs extend axially over the large diameter section.

4. The check valve of claim 1 wherein the retaining element is positively retained in the housing.

5. The check valve of claim 4 wherein the retaining element is held in place by peened-over parts of the housing.

6. The check valve of claim 1 wherein the retaining element is attached to the housing by at least one of welding and adhesive bonding.

7. The check valve of claim 1 wherein the housing is an undercut-free, as-molded part.

8. The check valve of claim 1 wherein the guide ribs are spaced from the retaining element.

9. The check valve of claim 1 wherein the housing is formed by one of sintering and pressing.

10. The check valve of claim 1 wherein the retaining element is formed with apertures s which permit fluid to flow therethrough while the retaining element exerts a resilient force on the ball.

11. The check valve of claim 1 wherein the retaining element comprises a closed circular outer area and a center, and wherein the spring tongue extends from the outer area to the center.

12. The check valve of claim 1 wherein the retaining element is stamped from sheet material.

13. The check valve of claim 1 wherein the retaining element has a compression-resistant outer area to allow peening.

14. The check valve of claim 1 wherein the retaining element is formed with a circumferential claw which is received in the housing in an interference fit.

15. The check valve of claim 1 wherein the housing has an end surface formed with a circumferential cutting edge so that the check valve can be installed in a receiving bore in an interference fit.

16. The check valve of claim 1 wherein the ball contacts the radially inner free end of the projection.

\* \* \* \* \*